May 7, 1935.  W. H. SEYMOUR  2,000,258
HEADLIGHT SIGNAL
Filed Sept. 8, 1930
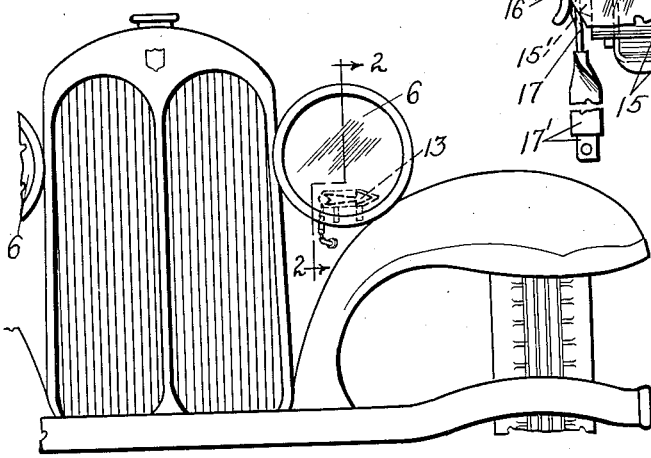
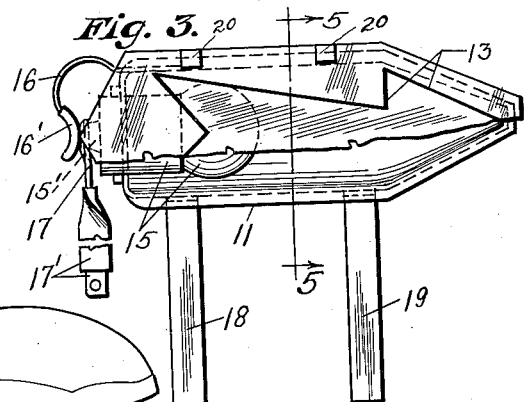
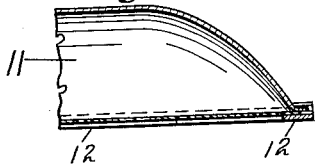
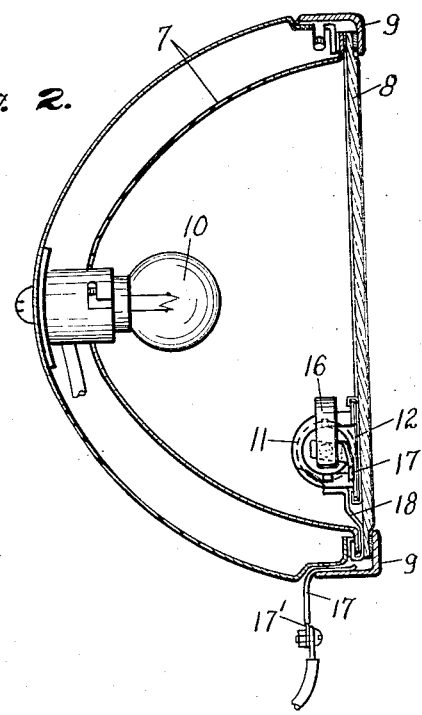
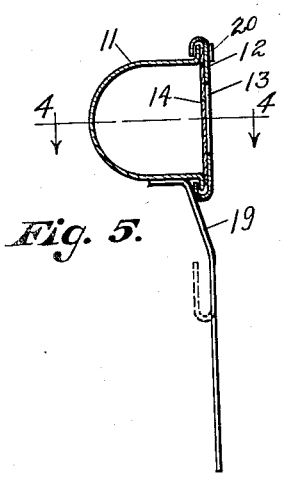
William H. Seymour
INVENTOR.
BY
ATTORNEYS.

Patented May 7, 1935

2,000,258

UNITED STATES PATENT OFFICE 2,000,258

HEADLIGHT SIGNAL

William H. Seymour, Los Angeles, Calif.

Application September 8, 1930, Serial No. 480,389

3 Claims. (Cl. 177—329)

My invention relates to headlight signals, and more particularly to a signal included within and made a part of a headlight for indicating the turn to right or left of the automobile or other vehicle.

My invention has among its salient objects to provide a signal means for indicating that an automobile is about to turn to the left and to do it in such a way that an approaching driver will be able to see the signal even though he is facing the headlights of the automobile carrying the signal.

It is well known that when two automobiles are approaching each other that the headlights blind the drivers so that it is next to impossible for a driver to see the arm of the approaching driver which is extended to indicate that he is turning to the left, or is to turn into his path at the intersection. My invention provides a signal in connection with the headlight so that it can be seen clearly while the headlight is on and the approaching driver is not dependent on seeing the arm signal, but will see the signal in the headlight which he is facing and which otherwise would prevent him from seeing the arm signal.

In order to explain my invention, I have illustrated the same on the accompanying sheet of drawing, which I will now describe.

Figure 1 is a front elevation, in part, of an automobile, showing one headlight with my invention applied thereto;

Figure 2 is an enlarged vertical sectional view through the headlight, taken on line 2—2 of Fig. 1;

Figure 3 is an enlarged front elevation of my signal detached from the headlight;

Figure 4 is a horizontal sectional view therethrough, taken on line 4—4 of Fig. 5; and Figure 5 is a fragmentary, horizontal sectional view through the signal body, at line 5—5 of Fig. 3.

Referring now in detail to the drawing, 6, designates the usual head light or lamp on an automobile. This lamp usually comprises a body 7, with a lens 8, and a detachable band or ring 9 for holding the lens on the lamp body 7, as clearly illustrated in Fig. 2. The lamp or globe is designated 10.

My invention as here illustrated for explanatory purposes consists of a small body 11, having a flat front 12, with arrow 13 cut therein, with glass 14 between the body 11 and said front 12. A lamp 15 is inserted into the end of the body 11, and is held therein by means of a leaf spring 16, secured at one end to the body 11, with its other end bent and provided with insulation covering 16' to bear upon the terminal 15' of the lamp. A flat circuit member 17 is yieldingly held against said terminal 15' by said spring 16 and is carried to any suitable source of electric energy, as indicated, where it can be plugged in or connected by the coupling as indicated at 17'.

Said flat circuit member 17 is sufficiently thin to be held between the lamp body 11 and the lens 8. This conductor 17 is carried into the lamp body 7 between the edge of the body and the lens 8, similar to the holding strap 18.

The body 11 has two springs or light ribbon-like members 18 and 19, which are bent to conform to the edge of the lamp body 7, back of the lens 8, and are clamped in place with the band or ring 9, with the flat front 12 against the inside of the lens 8, as clearly illustrated in Fig. 2. This prevents any reflections or other obstructions which are possible when this signal body 11 is not close up against the inside of the lens. It places the signal arrow against the inside of the lens and makes it clear to an approaching driver when the lamp 10 is lighted. In order to prevent any rattle or noise, I provide soft pads, as 20, 20, between the front of the signal and the lens 8 of the headlight. These are shown in Fig. 3, at the top of the figure.

Thus I have provided a very practical and effective signal in connection with a headlight which will indicate a turn to the left, or to the right also, if desired, and which can be seen when the headlights are turned on. This is clamped in place within the headlight by means of the lens 8 and the usual lens holding rings 9, by means of the metal supporting strips 18 and 19.

I do not limit my invention to the details of construction and arrangement shown for purposes of explanation, except as I may be limited by the hereto appended claims.

I claim:

1. A signal for headlights including an elongated case with a direction signal opening resting against the inside of the lens of the headlight, a thin flat supporting strip thereon adapted to be held between the lamp body and the lens of the headlight by the pressure of the lens retaining rim, a lamp socket in the end of said case, and circuit means of flat insulated form adapted to enter the headlight body through the space provided between the body and said lens by said supporting strip, said circuit means being adapted to be connected with a lamp in said lamp socket.

2. The combination with a headlight body, lens and retaining rim for said lens, of a signal case of elongated form having a direction indicating opening in one side resting against the inside of the lens of said headlight, a flat metal supporting strip on said signal case and positioned between the headlight body and said lens and held in place by the retaining rim therefor, a lamp holding socket in the end of said signal case, flat insulated circuit means extended through the space provided between the body and the lens by said supporting strip for said signal case, and means for holding said circuit means in position on said signal case to engage a lamp in said lamp holding socket in the end of said signal case.

3. The combination with a headlight body, lens and retaining rim for said lens, of a signal case of elongated form having a direction indicating opening in one side resting against the inside of the lens of said headlight, supporting means therefor consisting of a thin flat metallic strip capable of being bent around the reflector between the lens and the body of the headlight and held in place by the pressure of the lens retaining rim, flat insulated strips entering the headlight through the space provided between the reflector and the lens by said supporting strip, said signal case being metallic and having a spring clip for holding said flat insulated strip in place to contact the center contact of a lamp bulb projecting thru one end wall of said signal case, and a lamp socket in said end wall of the signal case for holding a lamp bulb therein and forming a connection between the shell contact of said bulb and the metallic casing, said spring clip also holding said lamp bulb in said socket.

WILLIAM H. SEYMOUR.